(12) United States Patent
Reynolds et al.

(10) Patent No.: US 7,742,928 B2
(45) Date of Patent: Jun. 22, 2010

(54) SYSTEM FOR RESOLVING DISTRESSED SHIPMENTS

(75) Inventors: David Eugene Reynolds, Haltom City, TX (US); Aaron Scott Paxton, Dallas, TX (US); Roland Ralph Zavala, Kingwood, TX (US); Laurielyn Fields, Houston, TX (US); James Francis Coughlan, Garland, TX (US); Christos Nicholas Anagnos, Round Rock, TX (US)

(73) Assignee: United Parcel Service of America, Inc., Atlanta, GA (US)

( * ) Notice: Subject to any disclaimer, the term of this patent is extended or adjusted under 35 U.S.C. 154(b) by 1637 days.

(21) Appl. No.: 10/435,493

(22) Filed: May 9, 2003

(65) Prior Publication Data

US 2004/0225624 A1   Nov. 11, 2004

(51) Int. Cl.
G06Q 99/00   (2006.01)
(52) U.S. Cl. ............... 705/1; 705/28; 705/26; 705/17; 705/401; 235/385; 340/572.1
(58) Field of Classification Search ............ 705/9, 705/7; 707/1
See application file for complete search history.

(56) References Cited

U.S. PATENT DOCUMENTS

| | | |
|---|---|---|
| 4,556,944 A | 12/1985 | Daniels et al. |
| 4,635,053 A | 1/1987 | Banks et al. |
| 4,636,634 A | 1/1987 | Harper et al. |
| 4,698,630 A | 10/1987 | Ellsberg |
| 4,792,270 A | 12/1988 | Yoshida |
| 4,803,348 A | 2/1989 | Lohrey et al. |
| 4,832,204 A | 5/1989 | Handy et al. |
| 4,836,352 A | 6/1989 | Tateno et al. |
| 4,894,717 A | 1/1990 | Komei |
| 4,896,024 A | 1/1990 | Morello et al. |
| 4,921,107 A | 5/1990 | Hofer |
| 4,961,507 A | 10/1990 | Higgins |
| 5,028,766 A | 7/1991 | Shah |

(Continued)

FOREIGN PATENT DOCUMENTS

EP   0 424 728 A2   5/1991

(Continued)

OTHER PUBLICATIONS

PCT International Searching Authority; *International Search Report and Written Opinion*; mailed Nov. 22, 2004; regarding International Application No. PCT/US2004/012610 (European Patent Office).

(Continued)

*Primary Examiner*—Vanel Frenel
(74) *Attorney, Agent, or Firm*—Alston & Bird LLP

(57) ABSTRACT

A cooperative system and an associated method are provided for resolving a distressed shipment during transport by a carrier, where the distressed shipment includes one or more parcels rendered temporarily undeliverable by an exception event while in transit from a shipper to a consignee. The inventive method involves the shipper in the task of contacting the consignee for the additional information necessary to resolve the shipment. The system creates a cooperative of participating shippers and carriers, working together to complete a shipment and thereby avoid the delay and expense associated with a premature or unnecessary return.

9 Claims, 11 Drawing Sheets

U.S. PATENT DOCUMENTS

| | | |
|---|---|---|
| 5,057,677 A | 10/1991 | Bertagna et al. |
| 5,091,713 A | 2/1992 | Horne et al. |
| 5,126,732 A | 6/1992 | Mardon |
| 5,169,222 A | 12/1992 | Bollore et al. |
| 5,205,436 A | 4/1993 | Savage |
| 5,206,637 A | 4/1993 | Warren |
| 5,208,449 A | 5/1993 | Eastman et al. |
| 5,212,644 A | 5/1993 | Frisch |
| 5,223,829 A | 6/1993 | Watabe |
| 5,231,272 A | 7/1993 | Mardon |
| 5,263,118 A | 11/1993 | Cornelison |
| 5,305,244 A | 4/1994 | Newman et al. |
| 5,315,094 A | 5/1994 | Lisy |
| 5,375,240 A | 12/1994 | Grundy |
| 5,386,462 A | 1/1995 | Schlamp |
| 5,455,409 A | 10/1995 | Smith et al. |
| 5,475,378 A | 12/1995 | Kaarsoo et al. |
| 5,509,572 A | 4/1996 | Curtis |
| 5,582,497 A | 12/1996 | Noguchi |
| 5,677,834 A | 10/1997 | Mooneyham |
| 5,694,551 A | 12/1997 | Doyle et al. |
| 5,712,789 A | 1/1998 | Radican |
| 5,758,329 A | 5/1998 | Wojcik et al. |
| 5,770,841 A | 6/1998 | Moed et al. |
| 5,774,053 A | 6/1998 | Porter |
| 5,869,819 A | 2/1999 | Knowles et al. |
| 5,933,816 A | 8/1999 | Zeanah et al. |
| 5,946,660 A | 8/1999 | McCarty et al. |
| 5,953,234 A | 9/1999 | Singer et al. |
| 5,979,750 A | 11/1999 | Kindell |
| 5,983,202 A | 11/1999 | Yabe et al. |
| 6,010,064 A | 1/2000 | Umeda et al. |
| 6,010,239 A | 1/2000 | Hardgrave et al. |
| 6,021,942 A | 2/2000 | Monico |
| 6,028,517 A | 2/2000 | Sansone et al. |
| 6,061,607 A | 5/2000 | Bradley et al. |
| 6,078,900 A | 6/2000 | Ettl et al. |
| 6,123,223 A | 9/2000 | Watkins |
| 6,148,291 A | 11/2000 | Radican |
| 6,167,378 A | 12/2000 | Webber, Jr. |
| 6,195,006 B1 | 2/2001 | Bowers et al. |
| 6,230,971 B1 | 5/2001 | Matsumoto et al. |
| 6,285,916 B1 | 9/2001 | Kadaba et al. |
| 6,289,260 B1 | 9/2001 | Bradley et al. |
| 6,300,873 B1 | 10/2001 | Kucharczyk et al. |
| 6,304,856 B1* | 10/2001 | Soga et al. ............... 705/28 |
| 6,323,782 B1 | 11/2001 | Stephens et al. |
| 6,344,796 B1 | 2/2002 | Ogilvie et al. |
| 6,367,696 B1 | 4/2002 | Inamitsu et al. |
| 6,404,337 B1 | 6/2002 | Van Till et al. |
| 6,416,270 B1 | 7/2002 | Steury et al. |
| 6,422,457 B1 | 7/2002 | Frich et al. |
| 6,439,345 B1 | 8/2002 | Recktenwald et al. |
| 6,456,900 B1 | 9/2002 | Kakuta |
| 6,480,758 B2 | 11/2002 | Stevens |
| 6,539,360 B1 | 3/2003 | Kadaba |
| 6,690,997 B2 | 2/2004 | Rivalto |
| 6,826,548 B2 | 11/2004 | Hungerpiller et al. |
| 7,191,142 B1* | 3/2007 | Sandell et al. ............... 705/9 |
| 7,212,984 B2* | 5/2007 | Wolfe et a ............... 705/7 |
| 7,422,149 B2* | 9/2008 | Aptekar ............... 235/385 |
| 2001/0017507 A1 | 8/2001 | Hara |
| 2001/0027471 A1 | 10/2001 | Paulose et al. |
| 2001/0032443 A1 | 10/2001 | Tiley et al. |
| 2001/0034673 A1 | 10/2001 | Yang et al. |
| 2001/0042024 A1 | 11/2001 | Rogers |
| 2001/0050615 A1 | 12/2001 | Kucharczyk et al. |
| 2002/0010634 A1 | 1/2002 | Roman et al. |
| 2002/0010661 A1 | 1/2002 | Waddington et al. |
| 2002/0013744 A1 | 1/2002 | Tsunenari et al. |
| 2002/0016715 A1 | 2/2002 | Razumov |
| 2002/0016726 A1* | 2/2002 | Ross ............... 705/7 |
| 2002/0019759 A1 | 2/2002 | Arunapuram et al. |
| 2002/0019761 A1 | 2/2002 | Lidow |
| 2002/0032501 A1 | 3/2002 | Tilles et al. |
| 2002/0032612 A1 | 3/2002 | Williams et al. |
| 2002/0035515 A1 | 3/2002 | Moreno |
| 2002/0035857 A1 | 3/2002 | Stein et al. |
| 2002/0038266 A1 | 3/2002 | Tuttrup et al. |
| 2002/0040860 A1 | 4/2002 | Isaacs et al. |
| 2002/0042665 A1 | 4/2002 | Kakuta |
| 2002/0042735 A1 | 4/2002 | Narahara et al. |
| 2002/0059121 A1 | 5/2002 | Schneider et al. |
| 2002/0067261 A1 | 6/2002 | Kucharczyk et al. |
| 2002/0073039 A1 | 6/2002 | Ogg et al. |
| 2002/0077937 A1 | 6/2002 | Lyons et al. |
| 2002/0082954 A1 | 6/2002 | Dunston |
| 2002/0087371 A1* | 7/2002 | Abendroth ............... 705/7 |
| 2002/0099631 A1 | 7/2002 | Vanker et al. |
| 2002/0107820 A1 | 8/2002 | Huxter |
| 2002/0116289 A1 | 8/2002 | Yang |
| 2002/0118111 A1 | 8/2002 | Brown et al. |
| 2002/0123944 A1 | 9/2002 | Williams et al. |
| 2002/0124389 A1 | 9/2002 | Matson |
| 2002/0133415 A1 | 9/2002 | Zarovinsky |
| 2002/0138173 A1 | 9/2002 | Barta et al. |
| 2002/0147919 A1 | 10/2002 | Gentry |
| 2002/0152093 A1 | 10/2002 | Chalmers et al. |
| 2002/0152128 A1 | 10/2002 | Walch et al. |
| 2002/0153994 A1 | 10/2002 | Bonner |
| 2002/0156645 A1* | 10/2002 | Hansen ............... 705/1 |
| 2002/0177922 A1 | 11/2002 | Bloom |
| 2002/0178074 A1 | 11/2002 | Bloom |
| 2003/0037009 A1 | 2/2003 | Tobin et al. |
| 2003/0040980 A1 | 2/2003 | Nakajima et al. |
| 2003/0050732 A1 | 3/2003 | Rivalto |
| 2003/0236688 A1 | 12/2003 | Kadaba et al. |
| 2004/0073499 A1* | 4/2004 | Martin et al. ............... 705/28 |
| 2004/0153433 A1* | 8/2004 | Nakamura ............... 707/1 |

FOREIGN PATENT DOCUMENTS

| | | |
|---|---|---|
| JP | 05-165847 | 7/1993 |
| JP | 05-274597 A | 10/1993 |
| JP | 05-330616 A | 12/1993 |
| JP | 08-307545 | 11/1996 |
| JP | 11-04005 A | 4/1999 |
| JP | 11-175621 | 7/1999 |
| WO | WO 00/00300 A1 | 6/1999 |
| WO | WO 00/30014 A1 | 5/2000 |
| WO | WO 00/46728 A1 | 8/2000 |
| WO | WO 01/16889 A1 | 3/2001 |
| WO | WO 01/29778 A1 | 4/2001 |
| WO | WO 01/35344 A2 | 5/2001 |
| WO | WO 01/67344 A1 | 9/2001 |
| WO | WO 01/72109 A2 | 10/2001 |
| WO | WO 01/88831 A2 | 11/2001 |
| WO | WO 01/99037 A1 | 12/2001 |
| WO | WO 02/07104 A1 | 1/2002 |
| WO | WO 02/08994 A3 | 1/2002 |
| WO | WO 02/17045 A2 | 2/2002 |
| WO | WO 02/052378 A2 | 7/2002 |
| WO | WO 02/101505 A2 | 12/2002 |
| WO | WO 03/019333 A2 | 3/2003 |

OTHER PUBLICATIONS

Connor, Michael; *UPS, FedEx Turn to US Post Agency to Test Services*; Nov. 6, 2003; two pages (Reuters, USA).

Weber, Harry R.; *UPS to Test Service for Direct Marketers*; Nov. 6, 2003; two pages (Associated Press, USA).

Canada Post Corporation; *Track a Package*; Publication Date Unknown; https://obc.canadapost.ca/emo/basicPin.

do?language=en; accessed in Jul. 2004 (Canada Post Corporation). Applicant makes no admission that this reference constitutes prior art.

*UPS Turns to Postal Service*; Nov. 6, 2003; two pages (CNN Money, USA).

*FedEx, UPS Turn to Postal Service*; Nov. 6, 2003; one page (Memphis Business Journal, USA; http://memphis.bizjournals.com/memphis/stories/2003/11/03/daily33.html).

*UPS, FedEx Turn to U.S. Post Office*; Nov. 6, 2003; one page (The Journal of Commerce Online, www.joc.com, USA).

Business Wire, UPS:US *United Parcel Service Inc.*, Nov. 7, 2003; three pages (Bloomberg, www.bloomberg.com, USA).

Harrington, Lisa H.; *The U.S. Postal Service Gets Serious About Serving Business in the New Economy*; May 2000, *Transportation & Distribution*, vol. 41, No. 5, pp. 14-16 (Penton Publishing, Inc., USA).

Henderson, Timothy P.; *Buy.com Boosts Returns Process Efficiency With New Solution* (Abstract Only); Nov. 2000, *Stores*, vol. 82, No. 11, pp. 72-76 (ProQuest Info. & Learning, USA).

Business Wire; *Many Happy Returns—UPS Unveils Advanced Outline Returns Solution*; Sep. 20, 2000 (Business Wire, USA).

De Marco, Donna; *E-Tail Presents Can Be Tougher to Send Back Than Order*; Dec. 28, 1999 (Knight-Ridder/Tribune Business News, USA).

Mongelluzzo, Bill; *Shipping Act Change Coming, But Only for UPS, FedEx?* Nov. 4, 2003; *The Journal of Commerce Online*, two pages (Commonwealth Business Media, www.joc.com, USA).

Brooks, Rick; *New UPS Delivery Service Sends Packages Through the Post Office*; Nov. 6, 2003; *The Wall Street Journal*, three pages (Dow, Jones & Company, Inc., USA).

SmarteCarte; *Worry-Free Lockers*; Publication Date Unknown; http://www.smartcarte.com/lockers/laptop.html; accessed in Sep. 2002. Applicants make no admission that this reference constitutes prior art.

Far East Lockers Co. Ltd; *Background*; Publication Date Unknown; http://www.fargogroup.com/gb/east_lockers/download/Logibag_lockers_GB.PDF; accessed in Sep. 2002. Applicanats make no admission that this reference constitutes prior art.

Research and Markets; *eFulfillment: Service Stations as Collection Points*; Sep. 2001; http://www.researchandmarkets.com/reports/2421 (accessed Sep. 2004). Applicant makes no admission that this reference constitutes prior art.

* cited by examiner

Data input to change the Delivery requests

Welcome Administrator

You can use this system to allow direct change of the address delivery changes on these pages.
In order to use these services, please take a few minutes to complete the form below. Changes made by you will be sent to your System Administrator via email.

| | |
|---|---|
| Date | 12/16/2002 |
| Type of Request | WUI-Redeliver Next Business Day |
| Tracking Number | |
| Consignee Name | |
| Consignee Company | |
| Consignee address | |
| | |
| Consignee City | |
| Consignee State | |
| Consignee Postal Code | |
| Consignee Country | |
| Consignee Phone | |
| Future Date | 12/21/2002 |
| Consignee Corrected Name | |

SYSTEM FOR RESOLVING DISTRESSED SHIPMENTS

A joint research agreement was executed in October of 2002 for the creation of a cooperative system and method for resolving distressed shipments during transport by a carrier. The system and method create a cooperative of participating shippers and carriers, working together to complete a shipment to avoid the delay and expense associated with a premature or unnecessary return. The names of the parties that executed the joint research agreement are Dell Products L.P., a Texas limited partnership having its principal offices at One Dell Way, Round Rock, Tex. 78682, and United Parcel Service General Services Co. and UPS Professional Services, Inc., each having its offices at 55 Glenlake Parkway, N.E., Atlanta, Ga. 30328. Both United Parcel Service General Services Co. and UPS Professional Services, Inc. are subsidiaries of the assignee, United Parcel Service of America, Inc.

FIELD OF THE INVENTION

The present invention relates generally to the field of parcel handling and processing. More particularly, the invention provides a system and a method of resolving a distressed shipment during its transport from a shipper to a consignee.

BACKGROUND OF THE INVENTION

Many parcels are not deliverable to the consignee on the first attempt, for a variety of reasons. Undeliverable parcels represent a significant logistical challenge for the carrier charged with transporting the parcel from the shipper to the consignee. An undeliverable parcel is sometimes referred to by a carrier as a delivery exception or a distressed shipment.

The shipper or sender, sometimes called the consignor, typically has no involvement in the shipment after the parcel is tendered to the carrier for delivery. Thus, the shipper may have only one opportunity to correctly mark and address the parcel with accurate consignee data.

The carrier often has a limited amount of information about the consignee, including only the consignee address in most cases. Many freight carriers have developed rules for processing a distressed shipment, typically including a number of delivery attempts followed by an intermediate holding period during which the consignee may retrieve the shipment. For the consignee or intended recipient, finding and collecting a temporarily undeliverable parcel requires time and effort.

For the shipper, the burden of accepting returned parcels can be enormously expensive and time-consuming. Returns require as much or more processing than preparing a shipment for delivery. Returned merchandise must be examined for quality, re-stocked and re-shelved, or otherwise processed. The burden on the shipper may develop into a total loss of the merchandise, especially for customized or built-to-order goods.

Thus, there is a need in the art for an improved system and method of handling and resolving distressed shipments in order to minimize the cost of returns and maximize the number of shipments that can be saved and ultimately delivered.

SUMMARY OF THE INVENTION

The above and other needs are met by the present invention, which generally provides a method for resolving a distressed shipment during transport by a carrier, the distressed shipment comprising one or more parcels rendered temporarily undeliverable by an exception event while in transit from a shipper to a consignee. The method includes detecting the exception event, communicating the exception event to the shipper, holding the distressed shipment during a finite intervention time window, the shipper contacting the consignee and receiving a consignee instruction, communicating the consignee instruction to the carrier, and completing the transport in accordance with the consignee instruction.

The step of communicating the consignee instruction to the carrier may be performed by the consignee. The method may also include, as part of the step of detecting the exception event, receiving an exception code from a driver attempting delivery of the shipment, and assigning a carrier code from a plurality of carrier codes, the carrier code correlated to the exception code. The step of communicating the exception event to the shipper may also include communicating the carrier code.

The method may further include assigning a unique intervention time window to the distressed shipment. In the method, where the finite intervention time window is defined by a capture time and a release time, the step of holding the distressed shipment further may further include recording the capture time when the step of holding begins, calculating the release time, monitoring a current time, and releasing the shipment for return to the shipper when the current time is later than the release time. In this aspect, the step of communicating the exception event to the shipper may also include communicating the capture time.

In the step of receiving a consignee instruction, the method may further include assigning a resolution code from a plurality of resolution codes, the resolution code correlated to the consignee instruction. In this aspect, the step of communicating a consignee instruction may further include communicating the resolution code.

The method step of holding the parcel may further include storing the parcel in a primary trap. Holding the parcel may also include storing the parcel in a secondary trap selected from one or more secondary traps.

The step of completing the transport may further include accepting a capture fee from the shipper.

The method may also include providing a viewer application accessible via the Internet by the shipper, the carrier, and the service provider. The viewer application may be configured to display information concerning the distressed shipment. The method may also include providing a resolution application accessible via the Internet by the shipper, the carrier, and the service provider. The resolution application may be in communication with the viewer application and may be configured to receive the resolution code from the shipper. In this aspect, the information may include the exception code and the carrier code. The information may also include the resolution code, and a resolution text message associated with the resolution code.

In another aspect, the present invention generally provides a cooperative system for resolving a distressed shipment during transport, the distressed shipment characterized by one or more parcels bound for a consignee and rendered undeliverable by an exception event. The cooperative system may include at least one shipper of the one or more parcels, a carrier in communication with the shipper, the carrier to receive the one or more parcels from the shipper, attempt delivery to the consignee, and record the exception event, and a primary trap for holding the distressed shipment during a finite intervention time window, the time window having sufficient duration to allow the shipper to contact the consignee and receive a consignee instruction, the carrier to complete the transport in accordance with the consignee instruction.

The system may also include a network of communication links between and among the shipper, the carrier, and the consignee. In the system, the carrier may capture the distressed shipment and deposit the shipment into the primary trap.

The system may also include a service provider for monitoring a current delivery status of the one or more parcels, communicating the current delivery status to the shipper and the carrier, and communicating the consignee instruction to the carrier. The cooperative system may be governed by an agreement between the shipper and the carrier. Where the carrier completes the transport in exchange for a capture fee, it may act in accordance with the agreement.

The cooperative system may also include a viewer application accessible via the Internet by the shipper, the carrier, and the service provider, the viewer application configured to display information concerning the distressed shipment; and a resolution application accessible via the Internet by the shipper, the carrier, and the service provider, the resolution application in communication with the viewer application and configured to receive the consignee instruction.

In another aspect, the present invention also generally provides an electronic distressed shipments resolution system, each of the distressed shipments comprising one or more parcels rendered temporarily undeliverable by an exception event while in transit from a shipper to a consignee. The electronic system may include a viewer application residing on a central processor, the viewer application configured to display a current table of the distressed shipments, the current table comprising a list associated with each of the distressed shipments, the list comprising a unique identifier field. The electronic system may also include a resolution application residing on the central processor, in communication with the viewer application, the resolution application configured to receive an input from a user selecting a certain distressed shipment from the current table, receive a resolution code from the user for the certain distressed shipment, and store the resolution code in a record associated with the certain distressed shipment.

The electronic system may be configured to electronically send the record to a carrier in possession of the selected distressed shipment. The list may also include a capture date field, a capture time field, and an exception code field. The viewer application may be further configured to sort the current table in order of a sort field selected from the fields in the list. The user may be the shipper. In the electronic system, the resolution code may be selected from a plurality of resolution codes, the resolution code correlated to a consignee instruction.

The viewer application and the resolution application may be configured to communicate electronically over a network. The resolution application may be configured to send the resolution code to the carrier via the Internet, via the World Wide Web, or via electronic mail.

These and other objects are accomplished by the system and method disclosed and will become apparent from the following detailed description of a preferred embodiment in conjunction with the accompanying drawings in which like numerals designate like elements.

BRIEF DESCRIPTION OF THE DRAWING

The invention will be more readily understood by reference to the following description, taken with the accompanying drawing figures, in which:

FIG. 11 is an illustration of a web page configured to receive input from a user into an online resolution application, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment, or an embodiment combining both software and hardware aspects. Furthermore, the present invention may take the form of a computer program product on a computer-readable storage medium having computer-readable program code means embodied in the storage medium. More particularly, the present invention may take the form of web-implemented computer software. Any suitable computer-readable storage medium may be utilized including hard disks, CD-ROMs, optical storage devices, or magnetic storage devices.

Figure 1:
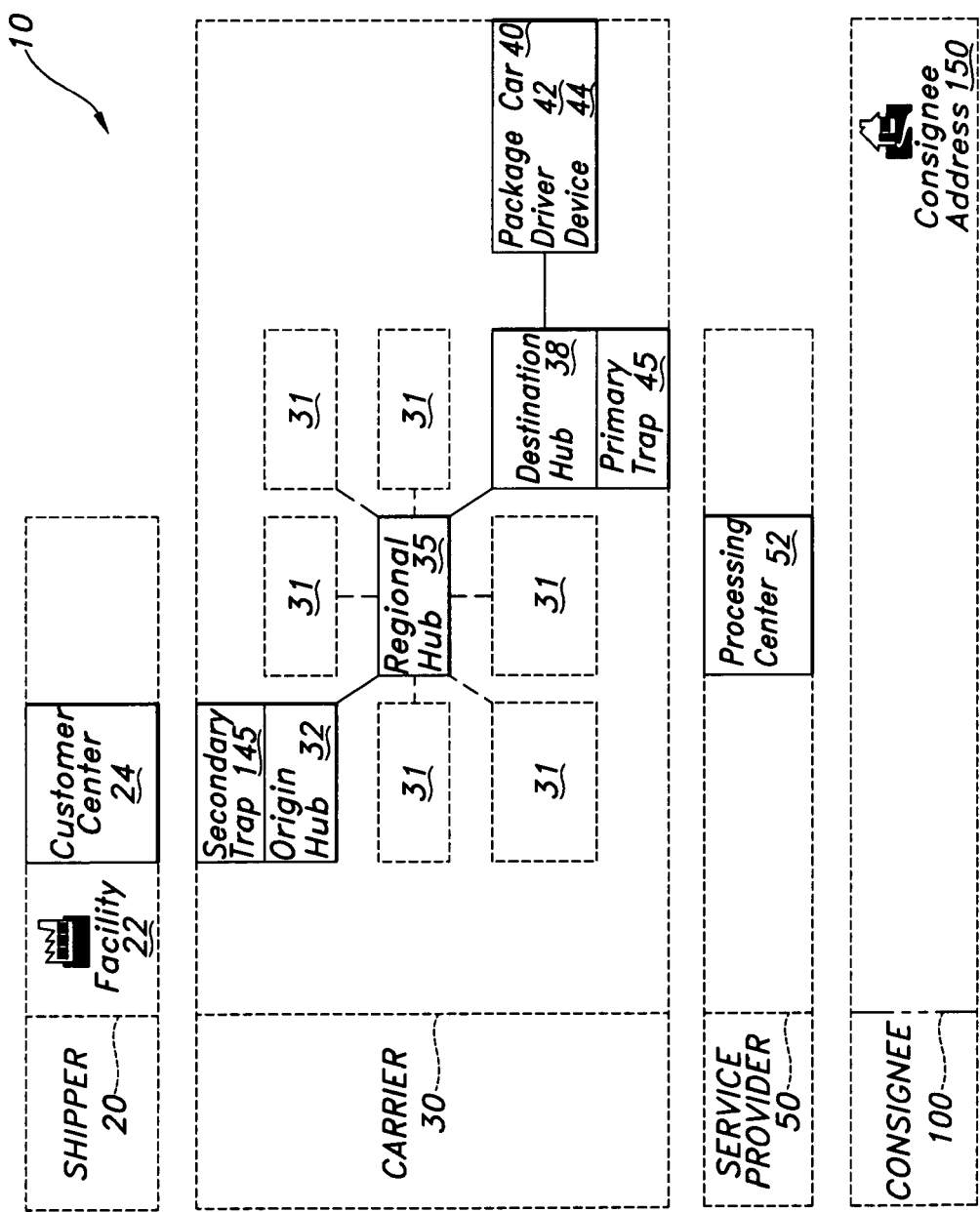
FIG. 1 is a schematic diagram showing the participating entities and facilities used in the system, according to an embodiment of the present invention.

Referring now in more detail to the drawings, FIG. 1 is a chart illustrating the physical facilities and the participating entities in the system 10, according to an embodiment of the present invention. The system 10 contemplates participation by one or more shippers 20 using a carrier 30 to ship one or more parcels to a plurality of consignees 100. The chart in FIG. 1 is divided generally into four rows, with each row containing an aspect of each participant. The parcel shipment process generally proceeds from left to right.

A shipper 20 generally includes a location or facility 22 and a customer service center 24. Participating shippers 20 may include manufacturers, distributors, packers, retailers, third- or fourth-party logistics providers, and other entities with a shipping need. Likewise, shipping facilities 22 may include factories, distribution centers, warehouses, and other types of locations. The customer center 24 includes personnel and equipment for processing orders, shipments, returns, and other customer service requests. The customer center 24 may include a large staff or it may be only one person. The customer center 24 may be component of the shipping company or, alternatively, it may be operated by a separate company hired to serve the shipper's customers.

The carrier 30, as shown in FIG. 1, may include a regional hub 35 surrounded by a plurality of local hubs 31. Although a hub-and-spoke arrangement is shown, the carrier 30 may use any arrangement of facilities particularly suited to its shipping operation. The hub located closest to the point of origin of a shipment will be referred to as the origin hub 32. Similarly, the local hub located closest to a parcel's destination will be referred to as the destination hub 38. The carrier 30 may include a fleet of delivery trucks or package cars 40, each of which may be staffed with a driver 42 and a communication device 44.

The destination hub 38 may include a location designated for holding parcels being held by the system 10 in a primary trap 45. The location, size, and configuration of the primary trap 45 may vary depending upon the needs of the system 10, as described herein. The primary trap 45 is described as primary because it is generally located close to the consignee 100, so that the primary trap 45 may be the first place to capture a distressed parcel 200.

Similarly, the origin hub 32 may include a secondary trap 145, to capture parcels that are not caught within the primary trap 45. Like the primary trap 45, the location, size, and configuration of the secondary trap 145 may vary depending upon the needs of the system 10.

The service provider 50 may be a department or a subsidiary of the carrier 30, it may be separate business entity, or it may be the carrier 30 itself. Generally, the service provider 50 works with the carrier 30 and the shipper 20 to coordinate the processing of parcels through the system 10. The processing center 52 may be incorporated into one of the carrier's facilities or it may be located elsewhere.

The intended recipient or consignee 100, as shown in FIG. 1, is located at a consignee address 150. The flow of parcel shipments through the system 10 of the present invention may take place within the context of the facilities and business entities shown. In one aspect of the system 10, the participating entities 20, 30, 50, 100 form a cooperative, with each entity contributing time, labor, information, and/or instructions, to achieve the common goal of completing the shipment of a parcel from the facility 22 to the consignee address 150.

Shipment Processing

Figure 2:
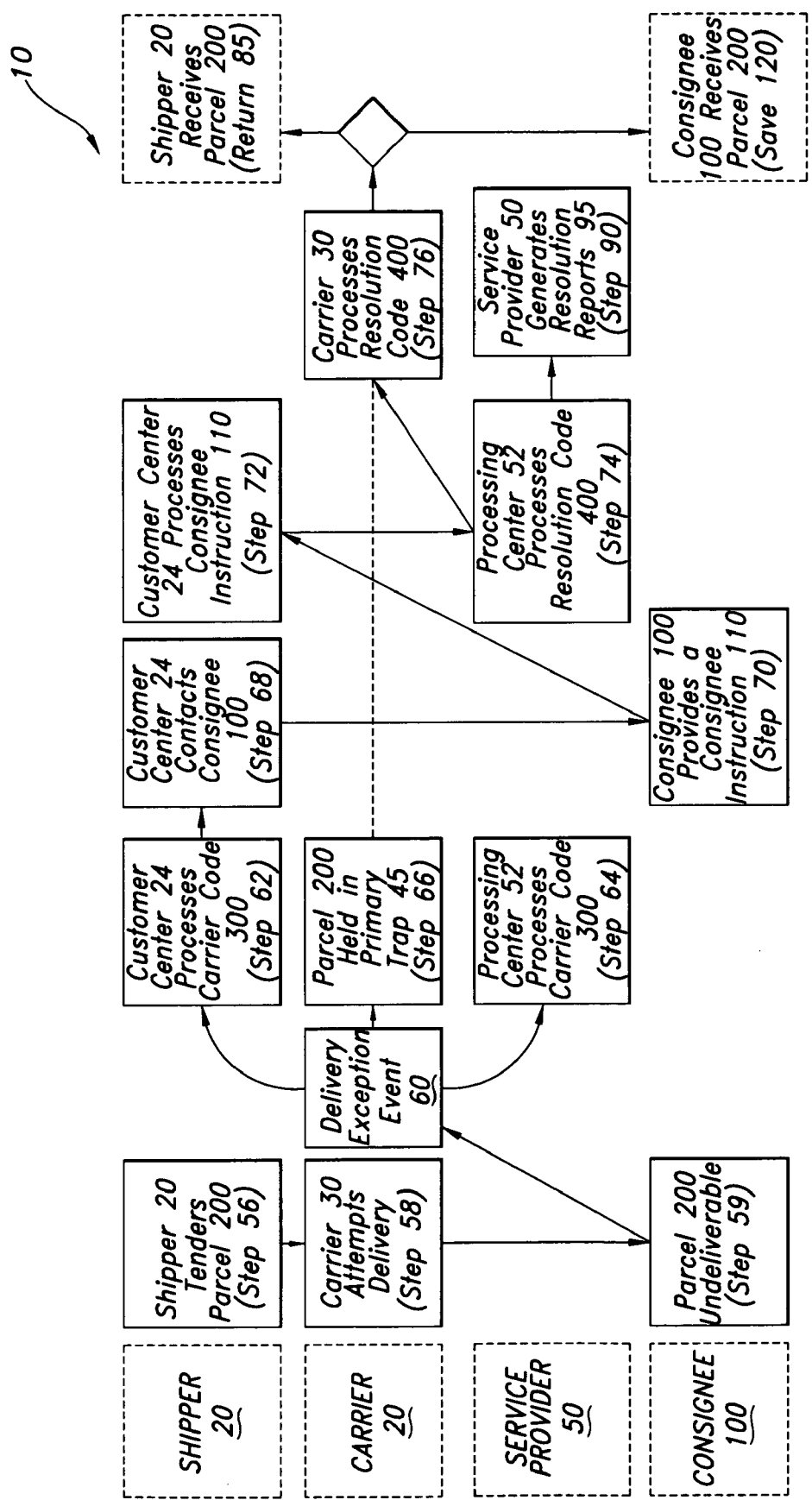
FIG. 2 is a flow chart describing the general process of a parcel from tender to resolution, according to an embodiment of the present invention.

FIG. 2 is a chart illustrating a series of steps according to one embodiment of the present invention. As shown, the system 10 contemplates participation by one or more of the following: a shipper 20, a carrier 30, a service provider 50, and a consignee 100. As in FIG. 1, the chart is divided generally into four rows, with each row containing the steps to be taken by each participant, according to one embodiment of the present invention.

Referring now to FIG. 2, the process of the present invention may begin with a shipper 20 tendering a parcel 200 to a carrier 30 (Step 56). The parcel 200 may bear a consignee address 150 and a tracking number. In a traditional freight system, the shipper's participation in a shipment ended when the parcel was tendered to a carrier. In the system 10 of the present invention, however, the shipper 20 plays a more active role, as described herein.

A tracking number may be assigned to act as a unique identifier for each parcel 200. When a code, a condition, a status, or another characteristic is described herein as being assigned to or associated with a parcel 200, it should be understood that the characteristic may be linked or tied to the parcel 200 by using its unique tracking number. Similarly, if a second identifier, such as a control number, is applied to a parcel 200 during its processing, any number of characteristics may be tied to the parcel 200 by reference to its control number.

If a shipment is completed (i.e., delivered to the consignee) the shipment will generally not enter the system 10 of the present invention. The system 10 is generally intended to coordinate the processing and handling of a parcel 200 that becomes temporarily undeliverable for any of a variety of reasons, such as:

the consignee 100 refuses to accept the shipment;
the consignee 100 refuses or declines to pay the cost on delivery (C.O.D.);
the shipment is held for pickup after one or more delivery attempts, but is never retrieved by the consignee 100;
the consignee address 150 is incorrect;
the consignee address 150 has been updated, re-directing the shipment to a new address;
the shipper 20 recalls the shipment;
the delivery date has been updated, directing the carrier 30 to delay delivery until a certain date in the future; or
any other situation that results in an undeliverable shipment.

An undeliverable shipment is sometimes referred to by a carrier 30 as a distressed shipment or a delivery exception. The circumstance may be referred to as a delivery exception event 60.

The Delivery Exception Event 60

In operation, the status of the parcel 200 and the particular circumstances surrounding the delivery exception event 60 are communicated to the carrier 30 by the driver 42 handling the parcel 200. The transmission may be accomplished using a handheld device, a wireless device, or another type of communication device 44 including a written report communicated on paper. In one embodiment, the driver 42 uses the device 44 to communicate the delivery exception event 60 to the carrier 30 immediately.

The delivery exception event 60, as shown in FIG. 2, may include multiple steps. In one embodiment, the driver 42 assigns an exception code 160 to the parcel, which is based upon the particular circumstances. The carrier 30 may develop an extensive list of standard exception codes to cover each of the various types of delivery exceptions that may occur. For example, a certain exception code may be correlated for an outright refusal by a consignee 100. The exception code 160 is transmitted back to the carrier 30 and/or to the service provider's processing center 52.

The delivery exception event 60 may further include the carrier 30 receiving the exception code 160. In one embodiment, the carrier 30 selects and assigns a carrier code 300 based upon the exception code 160. In practice, the carrier 30 may develop an extensive list of standard carrier codes for each of the various types of exception codes that may be received. As shown by the curved arrows in FIG. 2, the carrier 30 may transmit the carrier code 300 to the shipper's customer service center 24 and to the service provider's processing center 52.

Intervention & Hold

When a delivery exception event 60 occurs, the parcel 200 is held temporarily in a primary trap 45 (Step 66) while efforts are made toward a resolution of the shipment. In one embodiment, the parcel 200 is held until the shipment is resolved or until the expiration of a finite intervention time window, whichever occurs first. The carrier 30 may reach an agreement with a particular shipper 20 to hold a distressed parcel 20 for a specific period, such as five business days, after which the parcel 20 may be automatically returned to the shipper 20.

The finite intervention time window may be controlled and monitored by the service provider 50 in cooperation with the carrier 30. In one embodiment, a capture time including the date is recorded when the parcel 200 enters the primary trap 45. Alternatively, the capture time may be recorded when the exception code 160 is received. Based upon the capture time and the known duration of the finite intervention time window, a release time may be calculated and stored. The current time is monitored and periodically compared to the release time. If the shipment remains unresolved when the current time is later than the release time, the parcel 200 may be released and returned to the shipper 20.

The finite intervention time window may vary depending upon the particular needs of the participating shipper 20. A shipper 20 of perishable foods, for example, may require a shorter time window than a shipper 20 of auto parts. In one embodiment, a unique intervention time window may be selected by the shipper 20 for a particular parcel 200 being shipped. Once selected, the time window may remain associated with the parcel 200 and its tracking number.

The primary trap 45 does not refer to a specific facility, but rather indicates a condition of the shipment. For example, if a shipment is quickly resolved and the driver 42 is able to attempt re-delivery during the same trip, the primary trap 45 may be a shelf in the delivery truck or package car 40. For longer resolution times, the primary trap 45 may be an area inside the destination hub 38, such as a cage or a single shelf. The system 10 may include a large, separate warehouse to act as a primary trap 45, depending on the expected volume of parcels.

For distressed parcels that are not captured and held in the primary trap 45, for some reason, the system 10 may include one or more secondary traps 145. For example, a parcel 200 may be in the process of being transported back to the shipper 20 when it is selected for entry into the system 10. If the parcel has traveled back through the regional hub 35, for example, on its way back to the shipper 20, then a secondary trap 145 closer to the shipper 20 may be provided. As depicted in FIG. 1, the secondary trap 145 may be located near or incorporated into the origin hub 32, near the shipper 20. In use, the secondary trap 145 acts as a backup or substitute trap. For carriers 30 having a specialized arrangement of facilities, it may be advantageous to provide additional secondary traps 145 at various key locations.

In addition to holding the parcel 200 in a trap 45, 145 (Step 66, shown in FIG. 2), the carrier 30 may attach a specific label to the parcel 200 or assign a control number in order to monitor the status of each distressed parcel 200 in the system 10. In one embodiment, the parcel 200 is held for a maximum of five business days, after which the parcel 200 is returned to the shipper 20 automatically.

Shipper Participation

In one aspect of the inventive system 10, as shown in FIG. 2, the shipper 20 and its customer service center 24 may participate directly in the processing and attempted resolution of a distressed shipment. Step 62 in practice may involve several discrete steps, according to one embodiment of the present invention. The processing of the carrier code 300 by the customer center 24 in Step 62 generally involves receiving the carrier code 300, interpreting it, and storing it. The customer center 24 may store the carrier code 300 in a database to provide the shipper 20 with ready access to a variety of information about the distressed shipments 60 being processed and to assist the customer center 24 in its operations. For example, certain factors may help the customer center 24 prioritize the handling of distressed shipments 60 so that urgent needs are met first.

In Step 68, the customer center 24 may contact the consignee 100 and inquire about the circumstances of the refusal or other factors causing the delivery exception event 60. For example, if the consignee 100 refused to accept delivery of the parcel 200, the customer center 24 at this time has the opportunity to communicate directly with its customer (the consignee 100), and determine the circumstances of the refusal. In some cases, the customer center 24 may offer incentives to the consignee 100 to accept the shipment, including additional services or discounts. In this aspect of the system 10, the shipper's existing relationship with the consignee 100 is used to facilitate the ultimate delivery of the parcel 200. In many ways, the shipper 20 is better suited than the carrier 30 to communicate with the consignee 100 and resolve the shipment. Participation by the shipper 20 and its customer center 24 at this phase of the shipment represents a unique approach to solving distressed shipments. Typically, the freight carrier 30 would assume complete control of the parcel from tender to delivery and, for circumstances such as refusals, the parcel would simply be returned immediately to the shipper 20. The system 10 of the present invention prevents and avoids the costs associated with immediate returns.

In Step 70, a consignee instruction 110 is provided, which may originate in due course from a conversation with the consignee 100 or it may be received by way of the consignee's conduct, such as refusing to answer the shipper's request for information. The consignee 100 may provide a new address, schedule a particular time to receive the parcel, affirm the refusal, or respond in any of a variety of other ways. In any event, the consignee instruction 110 is obtained by the shipper's customer service center 24.

Having received the consignee instruction 110, the customer center 24 in Step 72 can process the consignee instruction 100, which may include the steps of assigning a resolution code 400 to the parcel 200 and transmitting the resolution code 400 to the processing center 52 and/or to the carrier 30. The shipper 20, together with the carrier 30 and/or the service provider 50, may develop an extensive list of standard resolution codes for each of the various types of consignee instructions 100 that may be received. For example, the system 10 may include a list of resolution codes instructing the carrier 30 to take certain action. For example:

| Resolution Code | Action |
| --- | --- |
| U1 | Re-deliver Next Business Day |
| U2 | Hold for Consignee Pickup |
| U3 | Return to Shipper Immediately |
| U4 | Re-deliver to a New Address |
| U5 | Re-deliver on a Future Date |
| U6 | Re-deliver to a Corrected Address |
| U7 | Continue Hold Until Further Notice |

In another aspect of the invention, the resolution code 400 may be used by the shipper 20 and/or its customer service center 24 to send an instruction to the carrier 20 in advance of the first delivery attempt. An immediate recall (using the "U3" resolution code, for example) may be useful in cases where a parcel 200 is known to be defective, where a consignee 100 cancels an order that has already shipped, or where the shipper 20 suspects a fraudulent transaction. In this aspect of the invention, including the shipper 20 as a more active participant in the shipment provides an opportunity for increased communication with the carrier 20 and a reduction of the delay and expense that often occurs without such communication.

In a related aspect of the invention, the resolution code 400 may be used by the carrier 30 and/or the service provider 50 to initiate an instruction at any time, before or after the first delivery attempt. An immediate recall (using the "U3 Return to Shipper" resolution code, for example) may be useful in cases where a parcel 200 is damaged in transit and rendered undeliverable. In this aspect, the carrier 30 may speed the return process and avoid delivering a damaged parcel 200 to a consignee 100.

Resolution

The processing center 52 in Step 74 receives the resolution code 400 for processing and, in turn, may transmit the resolution code 400 immediately to the carrier 30. In one embodiment, the processing center 52 may select and assign a resolution message, correlated to the particular resolution code 400 received, and transmit the resolution message to the carrier 30 for further action.

The carrier 30 in Step 76 receives and processes the resolution code 400, which contains instructions about how to handle the parcel 200 (which is being held in the primary trap 45 or one of the secondary traps 145). The processing in Step 76 may include transmitting the resolution code 400 to a driver 42.

Using information in the resolution code 400, the carrier 30 may now resolve the shipment either by returning the parcel to the shipper 20 (as a Return 85) or attempting another delivery to the consignee 100 (which, if successful, is known as a Save 120).

The performance of the system 10 of the present invention may be measured in a variety of ways, including keeping track of and reporting the number of returns 85 and number of saves 120. In one embodiment, the processing center generates periodic resolution reports 95 in Step 90. The content of the reports 95 may including the system status, billing information, auditing data, or any type of report to fill a business need. The content of the reports 95 may govern the payment for the use of the system 10. In one embodiment, the system 10 is a subscription-type service in which a shipper 20 pays a flat fee or a fee per parcel to the service provider 50 and/or the carrier 30 in exchange for the handling and coordination of services during the distressed shipment process. In another embodiment, the system 10 may be provided to a shipper 20 free of charge, as a value-added service offered by the carrier 20.

Communication Links

Figure 3:
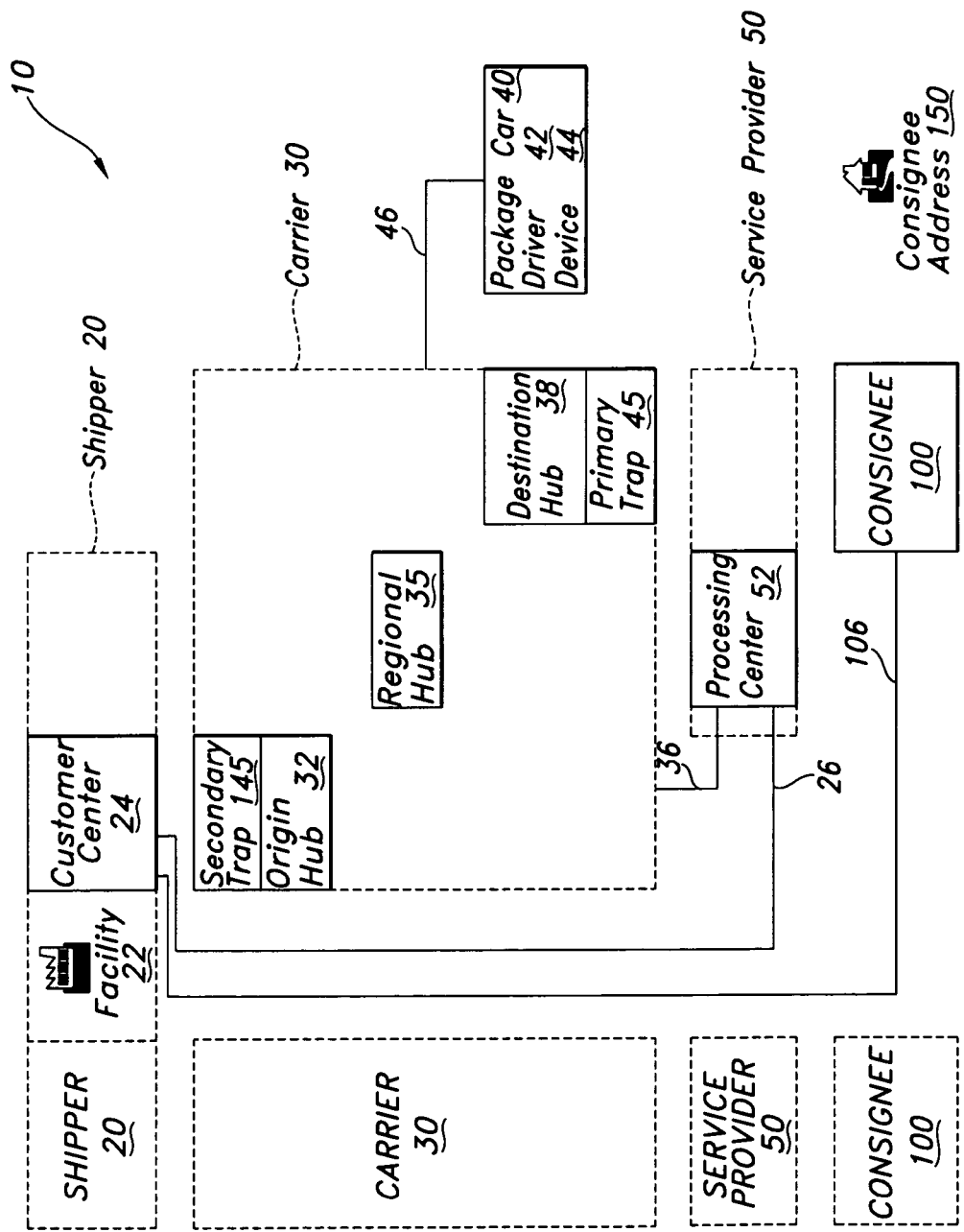
FIG. 3 is an illustration of the various communication links between and among the facilities and the entities participating in the system, according to an embodiment of the present invention.

FIG. 3 is a diagram of the communication links between and among the various participants in the system 10, in one embodiment of the present invention. In one embodiment, three of the main communication links in the system 10 are the shipper link 26, the consignee link 106, and the carrier link 36. The shipper link 26 connects the shipper 20 to the service provider 50. The consignee link 106 connects the shipper 20 to the consignee 100. The carrier link 36 connects the carrier 30 to the service provider 50.

In practice, these links 26, 106, 36 may connect to specific facilities or locations. As shown in FIG. 3, for example, the shipper link 26 connects the shipper's customer center 24 to the service provider's processing center 52. The consignee link 106 connects the shipper's customer center 24 to the consignee 100. The carrier link 36 connects the processing center 52 to the carrier 30.

A remote communication device 44 may be used when the driver 42 is away from the destination hub 38. In one embodiment of the present invention, a wireless communication device 44 may be programmed to transmit the data necessary to notify the carrier 30 when a distressed shipment occurs. This type of data transmission may occur over a driver link 46.

Each communication link described herein may transmit voice, data, or both, and may be as simple as a telephone connection or, in some cases, in writing. Transmissions may be sent via the Internet, via facsimile, via electronic mail, or transmitted using proprietary networks and software. In one embodiment of the invention, the participants may transmit data using standard Electronic Data Interchange (EDI) messages. EDI is a set of standards and technologies designed to automate the sending and receiving of routine business documents electronically. In another embodiment, Internet-based transmissions may be sent using the file transfer protocol, extensible markup language (XML), HTML, Java, or by any other web-based language or protocol. The links 26, 106, 36, 46 shown in FIG. 3 represent any of these types of communication systems.

The EDI format is used uniformly in a variety of industries, including the freight carrier industry. By using the EDI format, shippers and carriers may communicate specific and detailed information about a parcel being shipped. Each standard EDI transmission may include multiple segments or lines of data. Each segment contains multiple elements, listed in a particular order. A segment, for example, may include a sequential text file of comma-separated values (CSV), with each value or field containing data. Some of the standard EDI transmissions include EDI 210 (Freight Invoice), EDI 213 (Shipment Status Inquiry), EDI 214 (Shipment Status Report), and EDI 240 (Package Status).

Codes

The transmitting and receiving of shipment status data may be accomplished, in one embodiment, through the use of a series of codes selected to represent the condition of the shipment at a particular time. Several codes have been described in relation to FIG. 2, including the exception code 160, the carrier code 300, and the resolution code 400. In one aspect of the invention, the system 10 includes the development and dissemination of a comprehensive list of codes 160, 300, 400, each corresponding to a particular shipment condition or circumstance.

The system 10 of the present invention, in one embodiment, includes a method of selecting an appropriate code from the comprehensive list and a process for assigning the code to a particular parcel 200. In one embodiment, computer-based hardware and software may be developed to present the list of codes and prompt the user to select and assign the appropriate code. The code may be linked to or otherwise associated with a parcel 200 through the code's relationship to a unique identifier such as a tracking number. Because the tracking number typically remains associate with a specific parcel 200 throughout the delivery process, all codes and other data tied to the tracking number may be readily accessed.

Computer databases offer a useful tool when linking together data about a specific parcel 200. In one embodiment, for example, when a delivery exception event 60 occurs, the following data is saved to a database:

the unique tracking number for the parcel 200;
the exception code 160;
the date and time; and
the delivery zip code in a single database record. The record may include additional fields to receive and store additional related data, such as the shipper's order number, the consignee's electronic mail address, a contact telephone number, or a blank field for text comments. Database records are easy to maintain, easy to sort, and easy to share among users. In one embodiment, for example, the various participating entities in the system 10 may be given password-protected access to view one or more central databases containing all relevant data.

The exception code 160 may be selected by a driver 42 when the delivery exception event 60 occurs. The exception code 160 may be used by the carrier 30 to select and assign the carrier code 300 associated with the shipment. The carrier code 300 may be transmitted to the shipper 20 in EDI format; for example, as part of an EDI 214 Shipment Status Report or an EDI 240 Package Status report. The carrier code 300 may also be transmitted by voice, via the Internet, via facsimile, via electronic mail, or using proprietary networks and software.

The shipper 20 may use the carrier code 300 to select a corresponding approach, set of questions, or perhaps a complete text message to be sent or spoken to the consignee 100 when inquiring about the shipment. For example, a carrier code 300 indicating a direct refusal by a consignee 100 may be used by the shipper 20 and/or its customer center 24 to select a call script especially prepared for addressing a direct refusal.

The shipper 20 uses the consignee instruction 110 to select and assign a resolution code 400 for the parcel 200. In one embodiment, the resolution code 400 assigned by the shipper 20 may be transmitted to the carrier 30 as part of a standard EDI 213 Shipment Status Inquiry file. Like the exception code 160 and the carrier code 300, the resolution code 400 may also be transmitted by any other effective method, including sending it by telephone, over the Internet, via facsimile, via electronic mail, or using proprietary networks and software.

The Online Resolution Tool

In one embodiment, the system 10 includes an Internet-based viewer application 250 and a corresponding resolution application 260. The online applications coordinate most of the processing steps and data communications between the shipper 20, the carrier 30, and the service provider 50.

Figure 4:
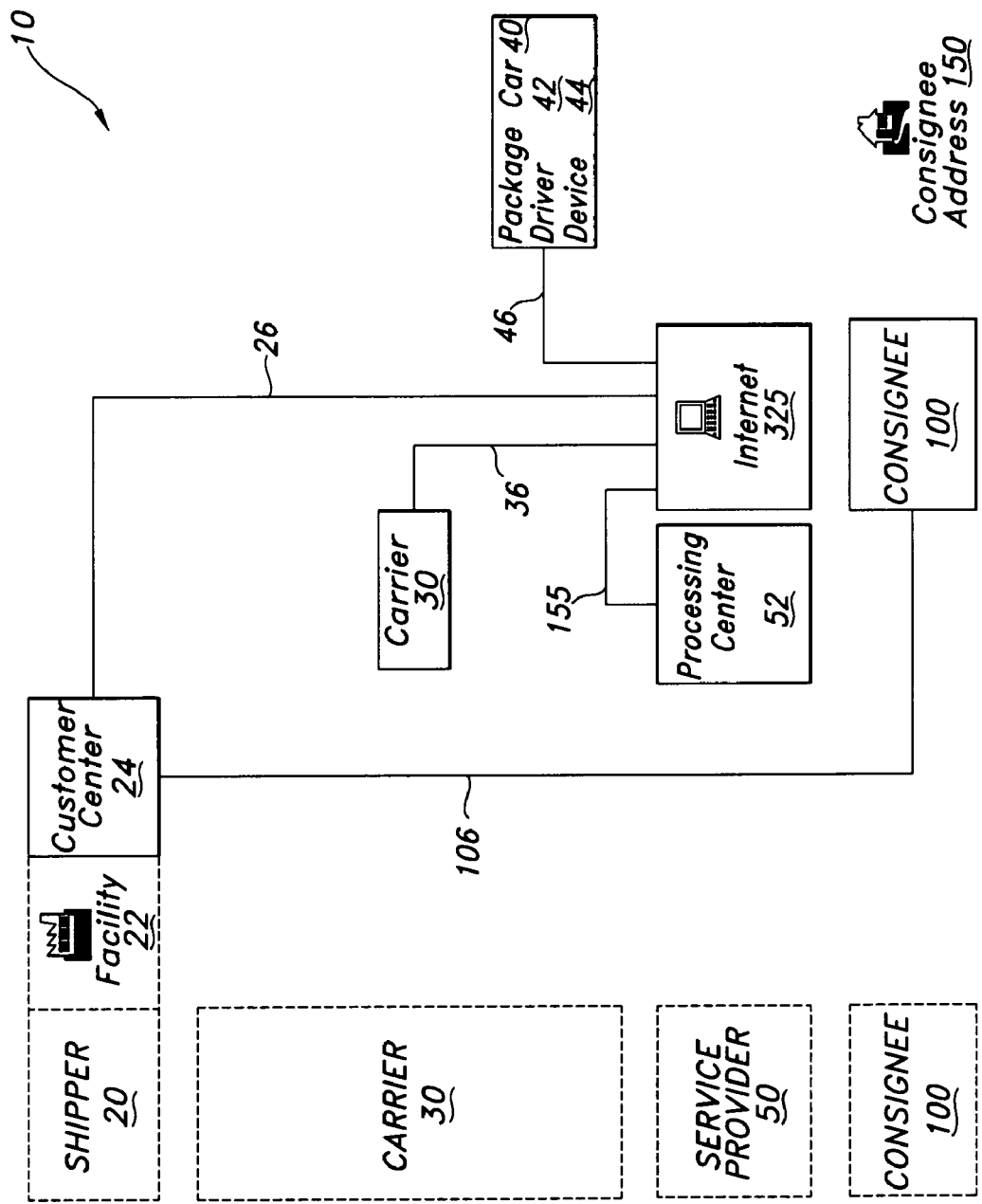
FIG. 4 is an illustration of the various communication links in the system connected by the Internet, according to an embodiment of the present invention.

FIG. 4 is a diagram showing the Internet 325 as the central hub for the various communication links 26, 36, 46, 106, 155 between the participants in the system 10, in one embodiment of the present invention. The processing link 155 connects the service provider's processing center 52 to the other participants, through the Internet 325. In one embodiment, the driver 42 may transmit the exception code 160 using a device 44 that connects to the Internet 325 via the driver link 46.

The present invention is described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, a special purpose computer, or another programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

System Architecture

Figure 5:
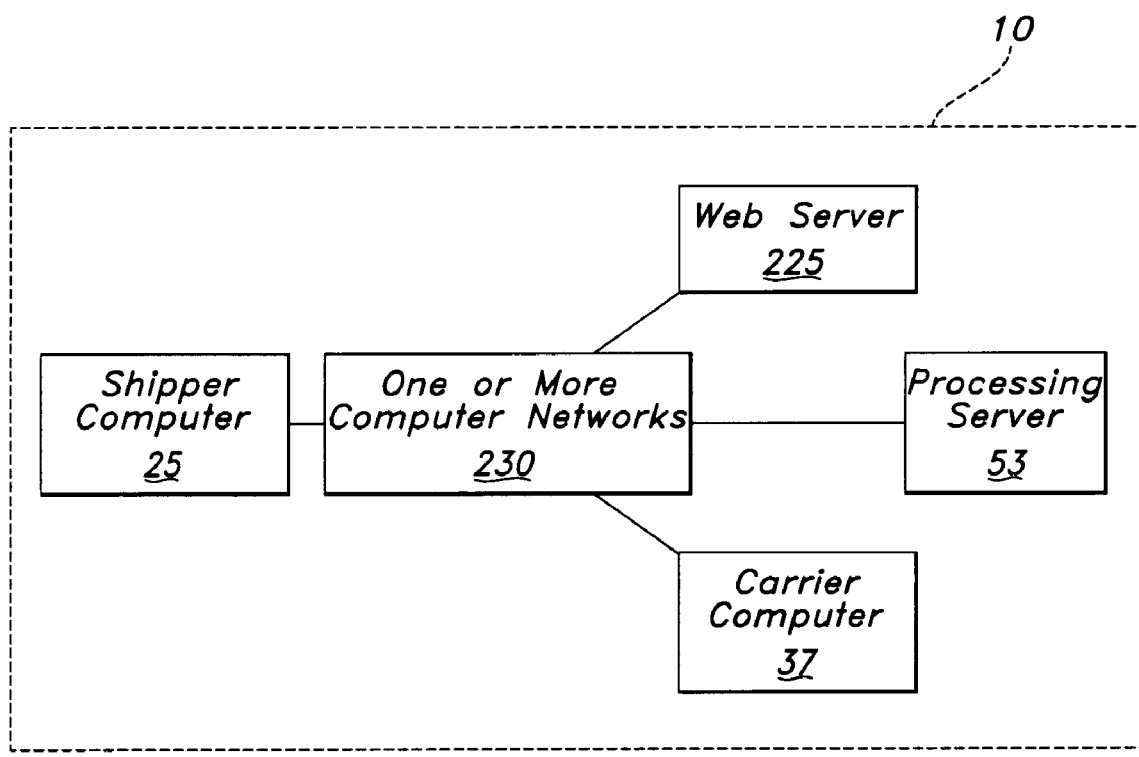
FIG. 5 is a first block diagram of a system according to one embodiment of the present invention.

FIG. 5 shows a block diagram of a system 10 in accordance with an embodiment of the present invention. As may be understood from this figure, the system 10 includes a shipper computer 25, one or more computer networks 230, a web server 225, a processing server 53, and a carrier computer 37. As can be appreciated by one of ordinary skill in the art, the one or more computer networks 230 facilitate communication between the shipper computer 25, the web server 225, the processing server 53, and the carrier computer 37. These one or more computer networks 230 may include any of a variety of types of computer networks such as the Internet, a private intranet, a private extranet, a public switch telephone network (PSTN), or any other type of network known in the art.

Figure 6:
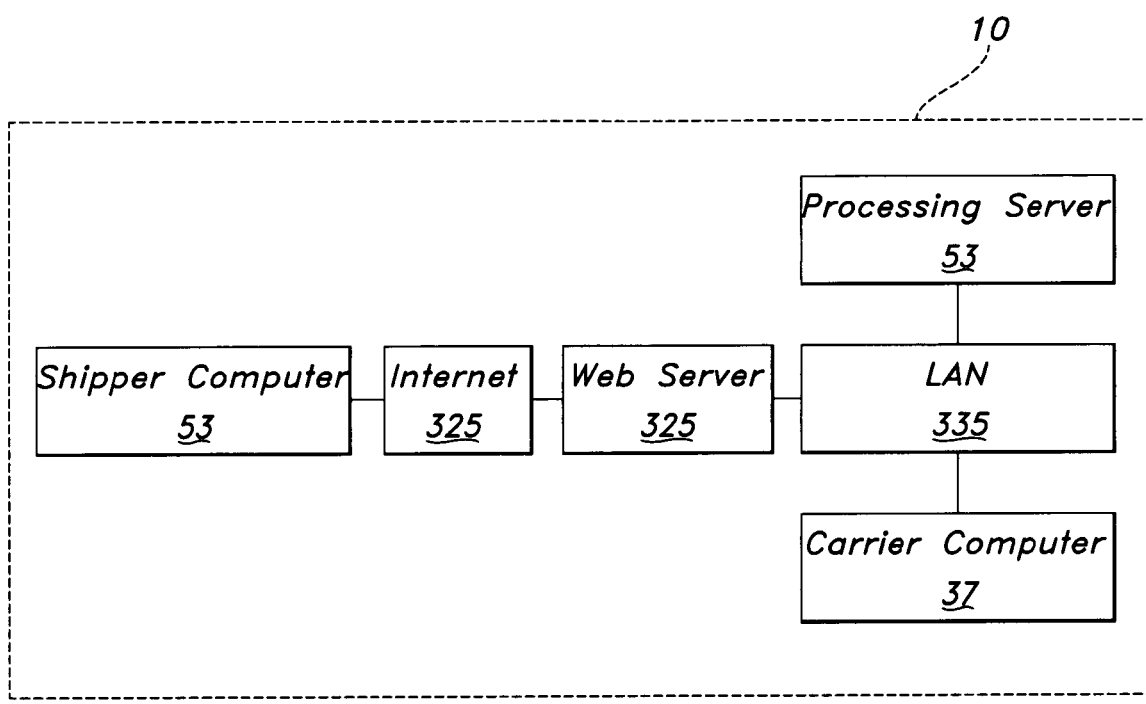
FIG. 6 is a second block diagram of a system according to another embodiment of the present invention.

In an embodiment of the invention shown in FIG. 6, the communication link between the shipper computer 25 and the web server 225 may be implemented via the Internet 325 using Internet protocol (IP), and the communication links between the web server 225, the processing server 53, and the carrier computer 37 may be implemented via a Local Area Network (LAN) 335.

Figure 7:
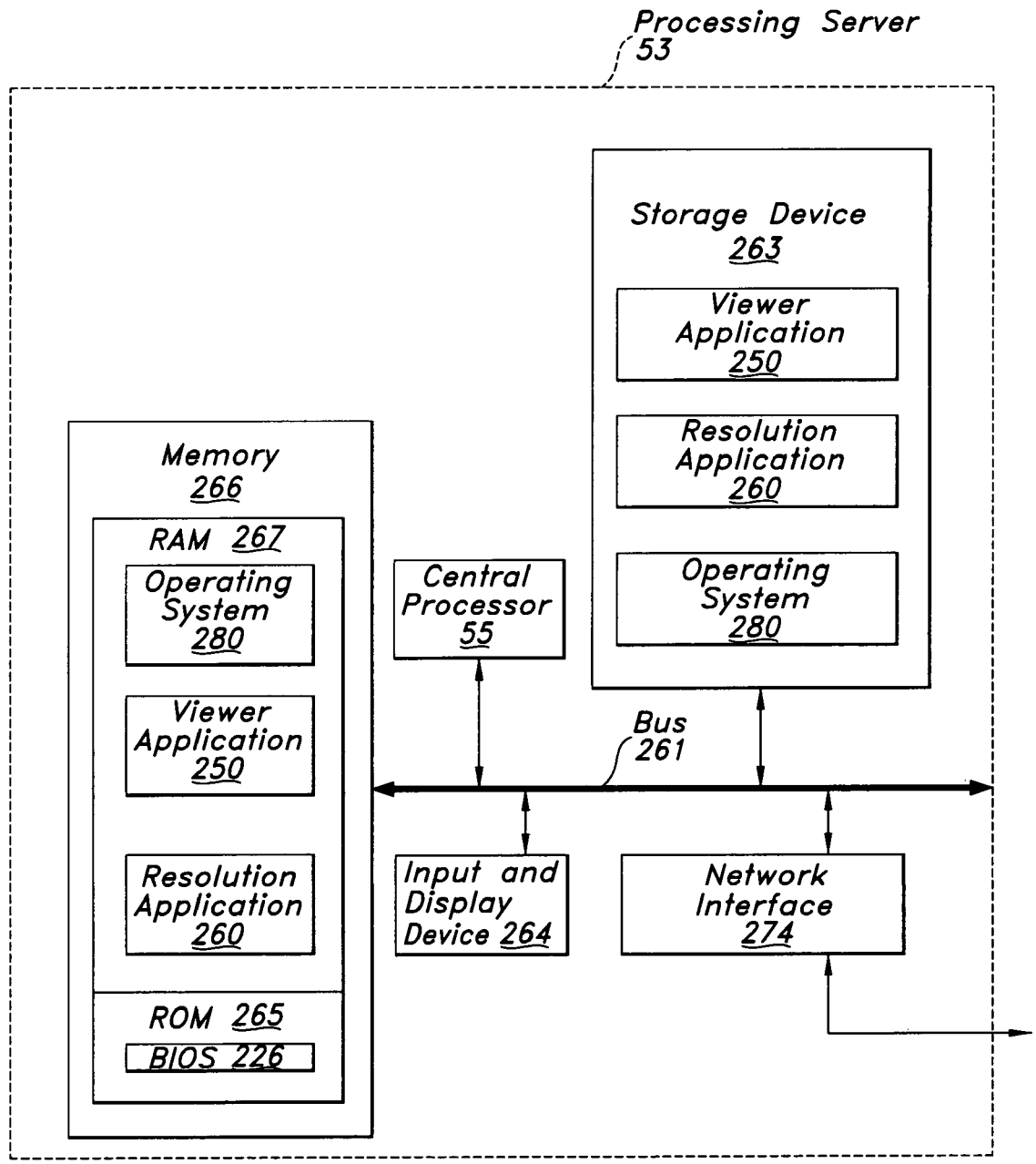
FIG. 7 is a block diagram of a processing server according to one embodiment of the invention.

FIG. 7 shows a block diagram of an exemplary embodiment of the processing server 53 shown in FIGS. 5 and 6. The processing server 53 includes a central processor 55 that communicates with other elements within the processing server 53 via a system interface or bus 261. Also included in the processing server 53 is a input and display device 264 for receiving and displaying data. This input and display device 264 may be, for example, a keyboard or pointing device that is used in combination with a monitor. The processing server 53 further includes memory 266, which preferably includes both read-only memory (ROM) 265 and random access memory (RAM) 267. The server's ROM 265 is used to store a basic input/output system 226 (BIOS), containing the basic routines that help to transfer information between elements within the processing server 53.

In addition, the processing server 53 includes at least one storage device 263, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 263 is connected to the system bus 261 by an appropriate interface. The storage devices 263 and their associated computer-readable media provide nonvolatile storage. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 267. Such program modules include an operating system 280, a viewer application 250 and a resolution application 260. The viewer application 250 and the resolution application 260 control certain aspects of the operation of the processing server 53, as is described in more detail below, with the assistance of the central processor 55 and the operating system 280.

Also located within the processing server 53 is a network interface 274, for interfacing and communicating with other elements of a computer network. It will be appreciated by one of ordinary skill in the art that one or more of the processing server 53 components may be located geographically remotely from other processing server 53 components. Furthermore, one or more of the components may be combined, and additional components performing functions described herein may be included in the processing server 53.

Viewer Application 250

The distressed shipment viewer application 250 may display summary information of all active, unresolved shipments for a particular shipper 20. A shipper 20 may be provided with a password-protected login, to gain access to the viewer application 250.

In one embodiment, the summary information is gleaned from the incoming carrier code 300, which may be transmitted by the carrier 30 in EDI format. For example, an incoming EDI 240 Package Status report may include a sequential text file of comma-separated values, with each value or field containing data. The viewer application 250 may parse the text file, select the component values needed for display, and store those selected values in a database table. For example, an EDI 240 message containing forty-five separate field values may be reduced, through the parsing process, to five critical field values for insertion into a smaller database table.

Figure 8:
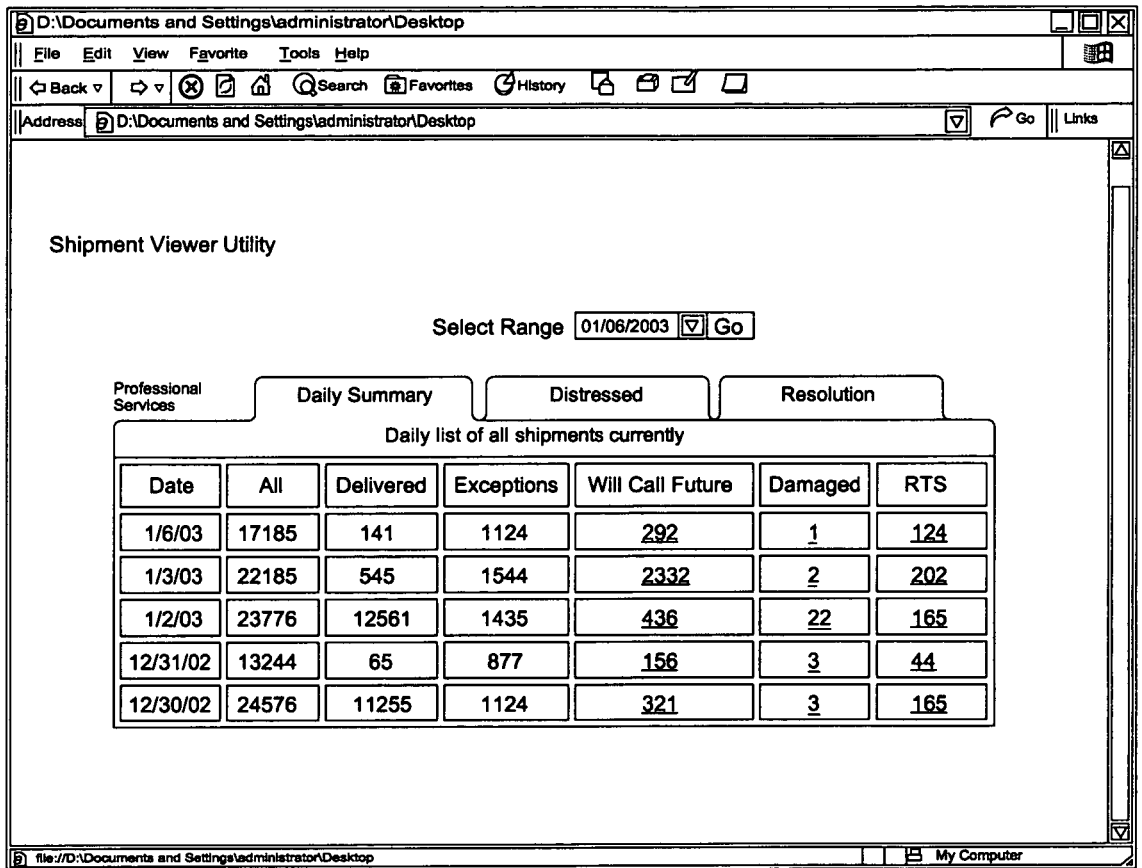
FIG. 8 is an illustration of a web page displaying information presented by a distressed shipment viewer application, according to one embodiment of the present invention.

The user interface for the viewer application 250 may present the data in a tabular format, as shown in FIG. 8, displaying a Daily Summary tab, a Distressed tab, and a Resolution tab. In one embodiment, the viewer application 250 tables may be sorted on any field. The underlined summary values may contain a hyperlink that, when selected, would display more detailed information to the user. In this aspect, the user may use the tabulated summary data to drill down and reveal additional detail.

Figure 9:
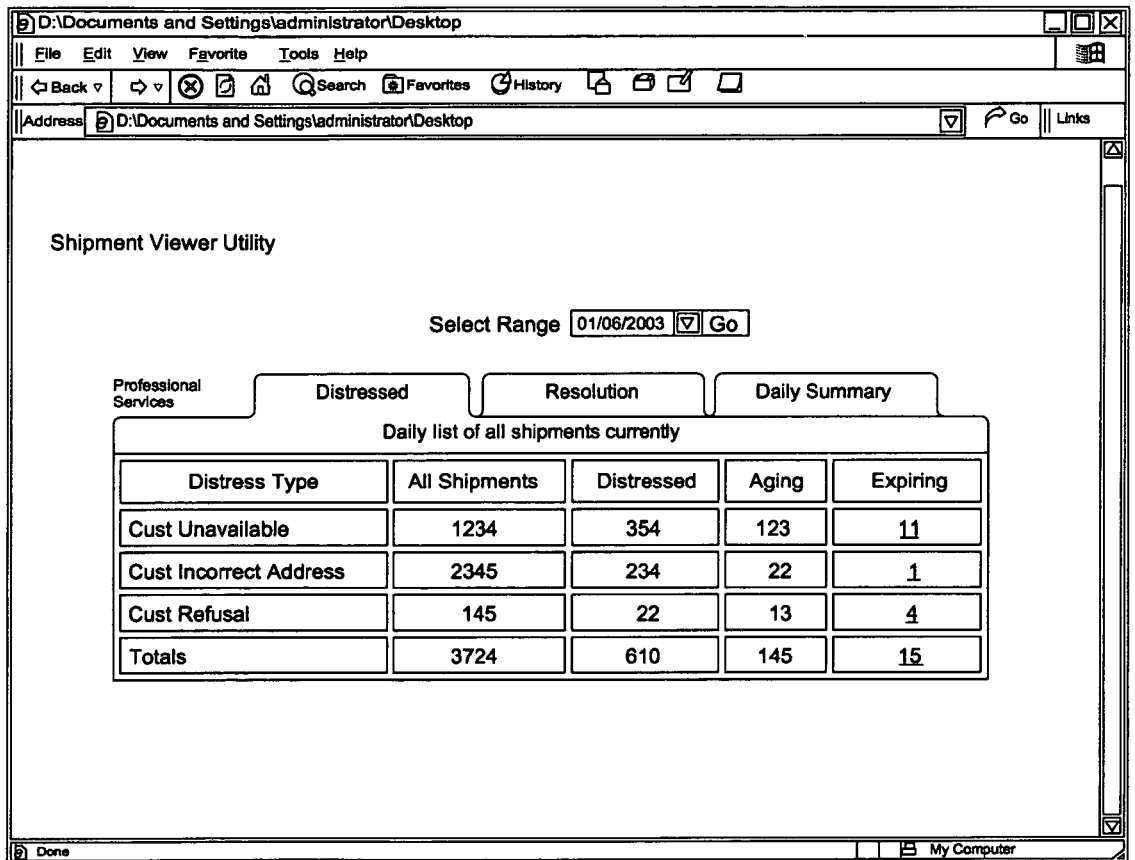
FIGS. 9 and 10 are illustrations of web pages displaying additional information presented by a distressed shipment viewer application, according to one embodiment of the present invention.
Figure 10:
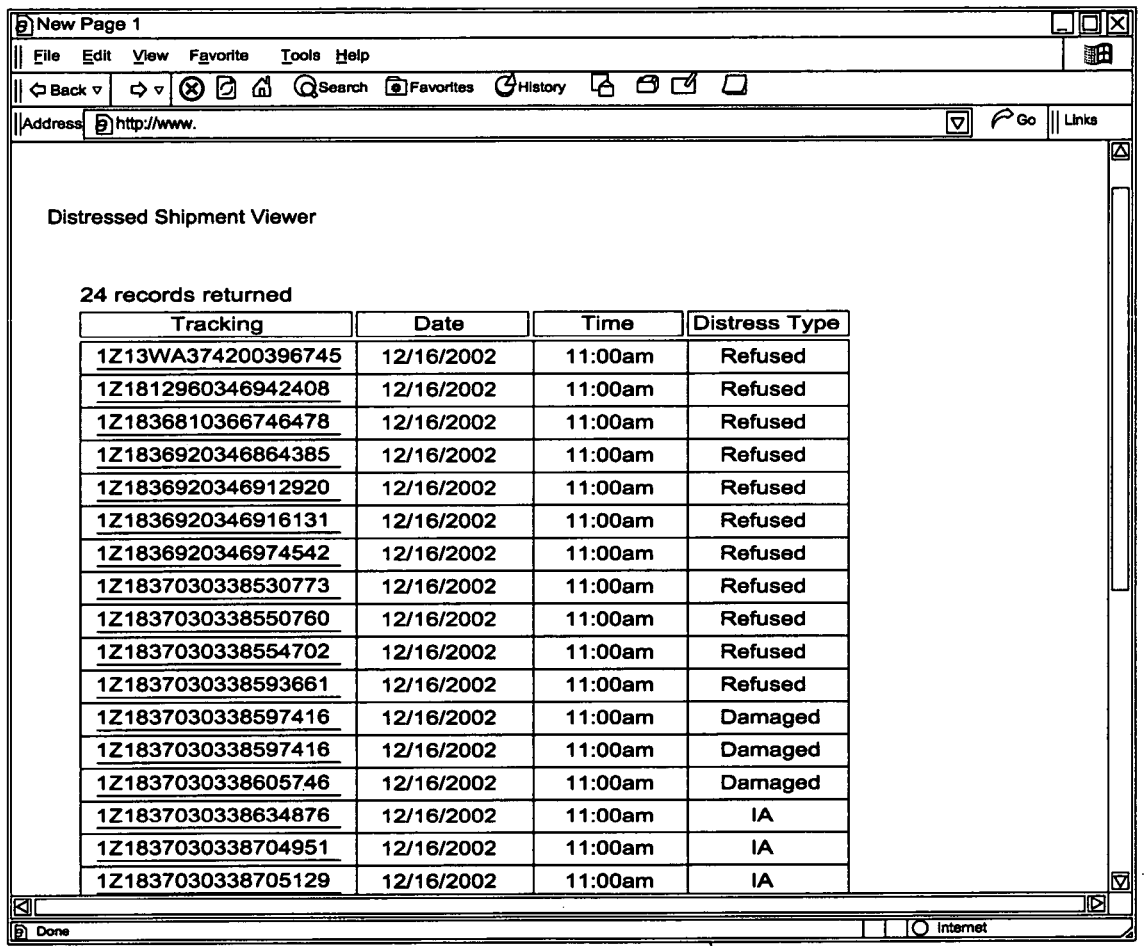

The Distressed tab, in one embodiment, may display a summary of the distressed shipments by type, as shown in FIG. 9, also displaying the number of parcels 200 currently "aging" (i.e., being held in a primary trap 45) and those parcels 200 "expiring" soon (i.e., where the current time is approaching the scheduled release time for the parcel 200). Again, selecting an underlined value activates a hyperlink to display further detail about a particular set. FIG. 10 shows the type of additional detail that may be provided by selecting a hyperlink.

Resolution Application 260

Selection of the Resolution tab of the viewer application 250, in one embodiment, may direct the user to the resolution application 260. An exemplary display for the resolution application 260 is shown in FIG. 11. The display may include a field, such as "Type of Request" field shown, for entry of the resolution code 400 selected by the shipper 20. A drop-down menu of options may include the entire list of permissible resolution codes. Entry of a tracking number or other unique parcel identifier enables the system 10 to keep data together concerning a particular parcel 200. The resolution application 260 may also include a type-ahead capability for automatically completing the data in a field based upon known information.

In one embodiment, the carrier 30 and the service provider 50 would also have access to the resolution application 260, so the data could be shared throughout the system 10. In use, the resolution application 260 may automatically fill certain fields after the user inputs data. For example, when a tracking number is entered, the resolution application 260 may automatically fill the consignee fields with the existing data; allowing the user to enter changes. In this aspect, the resolution application 260 enables the shipper 20 or its customer center 24 to enter additional information to be transmitted to the carrier 30 along with the resolution code 400. While the resolution code 400 may instruct the carrier 30 regarding the next step, the additional information stored by using the resolution application 260 provides the detail needed to quickly and accurately resolve the shipment.

While this invention has been described in specific detail with reference to the disclosed embodiments, it will be understood that many variations and modifications may be effected without departing from the invention as described in the appended claims.

What is claimed is:

1. A method for resolving a distressed shipment, comprising one or more parcels, rendered undeliverable by an exception event during transport by a carrier from a shipper to a consignee, the method comprising:

detecting an exception event, wherein detecting the exception event comprises receiving an exception code at a carrier computer system from a wireless handheld device operated by a driver attempting delivery of a shipment and the exception code indicates that said shipment is distressed and undeliverable to a consignee;

assigning a carrier code from a plurality of carrier codes, said carrier code correlated to said exception code and indicating that said shipment is distressed and undeliverable to the consignee;

initiating a hold command, wherein said hold command indicates that said distressed shipment should be stored in a trap during a finite intervention time window;

transmitting (a) said exception code, (b) said carrier code, or (c) both from the carrier computer system to a shipper computer system;

receiving input identifying said consignee's instructions about the disposition of the distressed shipment;

assigning, by the shipper computer system, a resolution code from a plurality of resolution codes, said resolution code correlated to said consignee's instructions;

transmitting said resolution code to said carrier computer system; and electronically providing, by said carrier computer system, an instruction to complete said transport of said distressed shipment in accordance with said resolution code.

2. The method of claim 1, wherein said finite intervention time window is a unique intervention time window, the method further comprising storing the unique intervention time window in association with a tracking number assigned to said distressed shipment.

3. The method of claim 1, wherein said finite intervention time window is defined by a capture time and a release time, and wherein said step of storing said distressed shipment further comprises:
- recording said capture time in response to said step of storing said distressed shipment begins;
- calculating said release time;
- monitoring a current time; and
- initiating a command to release said distressed shipment for return to said shipper when said current time is later than said release time.

4. The method of claim 3, wherein said step of transmitting (a) said exception code, (b) said carrier code, or (c) both from the carrier computer system to the shipper computer system further comprises transmitting said capture time.

5. The method of claim 1, wherein said trap is a primary trap.

6. The method of claim 1, wherein said trap is a secondary trap.

7. The method of claim 1 further comprising electronically receiving a capture fee associated with said distressed shipment.

8. The method of claim 1, further comprising:
- providing a viewer application accessible via a network, said viewer application configured to cause display of information concerning said distressed shipment; and
- wherein said input received identifying said consignee's instructions about the disposition of the distressed shipment is received via the viewer application.

9. The method of claim 8 further comprising generating and transmitting a resolution text message associated with said resolution code.

* * * * *